(12) United States Patent
Mont-Reynaud et al.

(10) Patent No.: US 12,013,862 B1
(45) Date of Patent: Jun. 18, 2024

(54) SPONSORED SEARCH RANKING SIMULATION FOR PATTERNS TRIGGERED BY NATURAL LANGUAGE QUERIES

(71) Applicant: SoundHound, Inc., Santa Clara, CA (US)

(72) Inventors: Bernard Mont-Reynaud, Sunnyvale, CA (US); Keyvan Mohajer, Los Gatos, CA (US); Kamyar Mohajer, San Jose, CA (US); Chris Wilson, Sunnyvale, CA (US)

(73) Assignee: SoundHound AI IP, LLC, Santa Clara, CA (US)

( * ) Notice: Subject to any disclaimer, the term of this patent is extended or adjusted under 35 U.S.C. 154(b) by 454 days.

(21) Appl. No.: 16/728,389

(22) Filed: Dec. 27, 2019

Related U.S. Application Data

(63) Continuation of application No. 14/459,275, filed on Aug. 13, 2014, now abandoned.

(60) Provisional application No. 61/869,031, filed on Aug. 22, 2013.

(51) Int. Cl.
*G06F 16/2457* (2019.01)
*G06F 16/951* (2019.01)
*G06Q 30/0251* (2023.01)

(52) U.S. Cl.
CPC ...... *G06F 16/24578* (2019.01); *G06F 16/951* (2019.01); *G06Q 30/0256* (2013.01)

(58) Field of Classification Search
None
See application file for complete search history.

(56) References Cited

U.S. PATENT DOCUMENTS

| | | | |
|---|---|---|---|
| 7,725,530 B2 | 5/2010 | Sah et al. |
| 7,730,082 B2 | 6/2010 | Sah et al. |
| 7,730,109 B2 | 6/2010 | Rohrs et al. |
| 7,882,097 B1 | 2/2011 | Ogilvie |

(Continued)

FOREIGN PATENT DOCUMENTS

| | | |
|---|---|---|
| WO | 2009111799 A2 | 9/2009 |
| WO | 2009144698 A1 | 12/2009 |

(Continued)

OTHER PUBLICATIONS

Pardoe and Stone, "A Paticle Filter for Bid Estimation in Ad Auctions with Periodic Ranking Observations," EC-10 Workshop on Trading Agent Design and Analusis, Cambridge, MA, Jun. 2010, 8 pages.

(Continued)

*Primary Examiner* — Kris E Mackes
*Assistant Examiner* — Soheila (Gina) Davanlou
(74) *Attorney, Agent, or Firm* — Haynes Beffel & Wolfeld LLP; Andrew L. Dunlap; Franklin M. Schellenberg (57) ABSTRACT

The technology disclosed relates to natural language understanding-based search engines, ranking sponsored search results and simulated ranking of sponsored search results. Tools and methods describe how to simulate the ranking of sponsored search results. The tools further identify instances of user queries within the scope of trigger patterns, optionally providing examples both of user queries for which a sponsored search result is likely to be displayed and examples for which the sponsored search result will not rank highly enough to be displayed, at least on the first page of search results.

20 Claims, 6 Drawing Sheets

(56) References Cited

U.S. PATENT DOCUMENTS

| | | | |
|---|---|---|---|
| 7,979,457 B1* | 7/2011 | Garman | G06Q 30/0625 |
| | | | 705/37 |
| 8,145,623 B1* | 3/2012 | Mehta | G06F 16/951 |
| | | | 707/713 |
| 8,386,314 B2 | 2/2013 | Kirkby et al. | |
| 8,429,630 B2 | 4/2013 | Nickolov et al. | |
| 9,355,191 B1* | 5/2016 | Finkelstein | G06F 16/90324 |
| 2005/0289124 A1* | 12/2005 | Kaiser | G06F 16/24522 |
| 2006/0069675 A1 | 3/2006 | Ogilvie | |
| 2008/0172422 A1* | 7/2008 | Li | G06F 16/9535 |
| 2009/0276771 A1 | 11/2009 | Nickolov et al. | |
| 2009/0327242 A1* | 12/2009 | Brown | G06F 16/24542 |
| 2010/0114945 A1* | 5/2010 | Olive | G06Q 30/02 |
| | | | 707/E17.014 |
| 2010/0153217 A1 | 6/2010 | Kirkby et al. | |
| 2010/0241647 A1* | 9/2010 | Ntoulas | G06F 16/24575 |
| | | | 707/765 |
| 2011/0099186 A1 | 4/2011 | Zohar et al. | |
| 2011/0119220 A1 | 5/2011 | Seolas et al. | |
| 2011/0185016 A1 | 7/2011 | Kandasamy et al. | |
| 2012/0059713 A1* | 3/2012 | Galas | G06Q 30/0241 |
| | | | 705/14.49 |
| 2012/0124478 A1 | 5/2012 | King et al. | |
| 2012/0158456 A1* | 6/2012 | Wang | G06Q 30/0241 |
| | | | 705/7.31 |
| 2012/0185484 A1* | 7/2012 | Jones | G06Q 10/101 |
| | | | 707/E17.069 |
| 2012/0209728 A1 | 8/2012 | Figg | |
| 2012/0239443 A1* | 9/2012 | Miller | G06F 16/243 |
| | | | 705/6 |
| 2013/0055097 A1 | 2/2013 | Soroca et al. | |

FOREIGN PATENT DOCUMENTS

| | | |
|---|---|---|
| WO | 2010119288 A1 | 10/2010 |
| WO | 2011041465 A1 | 4/2011 |
| WO | 2012103439 A2 | 8/2012 |

OTHER PUBLICATIONS

Fabia S., "2 Amazing Tools to Analyze Your AdWords Competition," WhiteSharkMedia.com, Apr. 29, 2013, Excerpts from<http://www.whitesharkmedia.com/blog/analyze-adwords-competition-tools/> retrieved Aug. 2, 2013, 11 pages.

"AdWords Help," Google, 2013, <http://support.google.com/adwords/answer/2756257?hl=en&ref_topic=1713958> retrieved, Apr. 24, 2013, 29 pages.

U.S. Appl. No. 14/459,275—Office Action dated Jun. 16, 2017, 21 pages.

U.S. Appl. No. 14/459,275—Response to Office Action dated Jun. 16, 2017, filed Sep. 19, 2017, 14 pages.

U.S. Appl. No. 14/459,275—Final Office Action dated Jan. 4, 2018, 20 pages.

U.S. Appl. No. 14/459,275—Response to Final Office Action dated Jan. 4, 2018 filed Mar. 23, 2018, 17 pages.

U.S. Appl. No. 14/459,275—Office Action dated Nov. 14, 2018, 26 pages.

U.S. Appl. No. 14/459,275—Response to Office Action dated Nov. 14, 2018 filed Apr. 11, 2019, 13 pages.

U.S. Appl. No. 14/459,275—Final Office Action dated Jul. 30, 2019, 20 pages.

* cited by examiner

FIG. 7 – Computer System

Example frame for restaurants 610

| | | | | |
|---|---|---|---|---|
| Name 611 | | | Lat, Lon 613 | |
| Nationality 621 | | | Location code 623 | |
| Price range 631 | | | Hours 631 | |
| Take out 641 | | | Days open 641 | |
| Reserve 651 | | | Parking 651 | |
| Noisy 661 | | | More ... | |
| Patio 671 | | | | |
| Formal 681 | | | | |
| More ... | | | | |

Fig. 6

SPONSORED SEARCH RANKING SIMULATION FOR PATTERNS TRIGGERED BY NATURAL LANGUAGE QUERIES

PRIORITY AND RELATED STATEMENT

This application is a continuation of U.S. Non-Provisional application Ser. No. 14/459,275, entitled "SPONSORED SEARCH RANKING SIMULATION FOR PATTERNS TRIGGERED BY NATURAL LANGUAGE QUERIES", filed Aug. 13, 2014, which claims the benefit of U.S. Provisional Application No. 61/869,031, entitled, "SPONSORED SEARCH RANKING SIMULATION FOR PATTERNS TRIGGERED BY NATURAL LANGUAGE QUERIES," filed on Aug. 22, 2013. The non-provisional and provisional applications are hereby incorporated by reference for all purposes.

The application is related to "INTEGRATED PROGRAMMING FRAMEWORK FOR SPEECH AND TEXT UNDERSTANDING WITH MEANING PARSING", U.S. patent application Ser. No. 13/842,735, filed on Mar. 15, 2013, which claims the benefit of, "INTEGRATED PROGRAMMING FRAMEWORK FOR SPEECH AND TEXT UNDERSTANDING", U.S. Provisional Application No. 61/798,526 filed on the same day Mar. 15, 2013. The provisional application and nonprovisional are hereby incorporated by reference for all purposes.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

The technology disclosed relates to natural language understanding-based search engines, ranking sponsored search results and simulated ranking of sponsored search results. Tools and methods described simulate the ranking of sponsored search results. The tools further identify instances of organic queries that trigger sponsored query patterns.

Natural language understanding is beginning to be applied to queries, both within restricted domains and for general inquiries, with mixed results, as indicated by user experience with Apple's Siri™ and parodies of it.

Sponsored search results, responsive to queries, are currently triggered by keywords, not by natural language understanding. Placement of sponsored search results follows keyword auctions provided by search providers such as Google, Microsoft and Yahoo. Although Google has started to move away from pure keyword matching and towards concepts and knowledge graphs (Singhal, Amit, "Introducing the Knowledge Graph: Things, Not Strings," Google OfficialBlog, May 16, 2012) there is no evidence yet that they are applying this approach to online advertising.

In the related situation of contextual advertising or Context Match (CM), the use of natural language semantic analysis of the text on a web page for targeted on-page advertising has received attention. A paper by Yahoo Research ("A Semantic Approach to Contextual Advertising," Broder et al., SIGIR '07) proposes the use of a taxonomy whose categories are applied to messages and to webpages, as part of a semantic-syntactic approach, and various Yahoo patents related to CM have followed. A patent application assigned to Peer39 ("System and method for classifying webpages", US 20120158496 A1, filed Dec. 20, 2010, published Jun. 21, 2012) proposes to semantically analyze a webpage to produce classification parameters relevant to a real time bidding process for message placement on the webpage. Interestingly, this patent gives no information whatsoever about its techniques of semantic analysis, the nature of the classification or any other information that would allow replication of the work; it is focused on business processes that derive from a semantic analysis of an undefined sort.

Applicant and these inventors have uncovered new problems that result from attempting to combine natural language understanding with sponsored online messaging, as further explained below. Accordingly, it is desirable to provide systems and methods to support sponsorship in a natural language context. An opportunity arises to help sponsors define natural language triggers for messages, resulting in improved relevance of the messages to the user queries, as well as simulate the effect of selected natural language triggers and price points on sponsored message placement, resulting in an improved use of sponsorship budgets.

SUMMARY

The technology disclosed relates to natural language understanding-based search engines, ranking sponsored search results and simulated ranking of sponsored search results. Tools and methods described include the definition of trigger patterns for sponsored messages, of the matching of a trigger pattern with a query, and of simulating the ranking of sponsored search results in order to assist sponsors in the choice of the best trigger patterns and price points for their goals.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

New Problems and Results

New problems and new results of applying technology to overcome the problems are presented. One new problem involves unsuitability of keyword triggers and traditional tools for sponsored search placement to processing of natural language queries. There are multiple layers to this problem, which are further apparent from the discussion below. Another new problem is to simulate ranking and placement of sponsored search result responsive to new natural language-based triggers and associated price points. This problem relates to the difficulty of testing equivalence between complex programs, which is a difficulty not faced by keyword-based placement of sponsored search results.

New results relate to simulation of result ranking and impressions generated by natural language-based triggers of sponsored search. In this context, a trigger pattern may be a natural language expression, chosen by or on behalf of a search result sponsor, that specifies when a sponsored message associated with the search results should be presented to the user, by way of display, audio playback or other presentation formats.

The natural language expression that specifies a trigger pattern is translated by a NL processing module into a semantic data structure, one that represents its meaning, and is called the deep structure of the pattern. A natural language query can be similarly processed into its meaning—also a deep structure, a.k.a. semantic representation. Both deep structures (that of the pattern and that of the query) are tested for compatibility to decide if the query triggers the pattern. The compatibility or semantic match process that lies at the core of this approach will be discussed later.

Consider an example. A user submits the query, "find me a nice Chinese restaurant within 2 miles of Lynn Way". Sponsors a . . . n have already submitted sponsored messages with the natural language triggers:
  (1) "Asian food near Sunnyvale";
  (2) "nice restaurants in Silicon Valley";
  (3) "Chinese near Santa Clara";
  (4) "fine Chinese restaurants within 3 miles of Main and First Streets Sunnyvale"; and
  (5) "expensive Chinese restaurants between San Jose and Palo Alto".

Natural language understanding determines the deep structure of the user query by interpreting the type of food as Chinese, the quality of restaurant as nice, and the location as a latitude and longitude combined with a surrounding area, however that area is coded. (Alternative ways of coding areas are identified below.) Each of the sponsored trigger queries is understood and its deep structure is represented in a data structure compatible with the data structure that expresses the user query. The sponsored trigger queries may include further instructions on handling of implicit context and rules for fuzzy matching. The messages associated with the trigger queries carry a price point.

All five sponsored patterns have deep structure that matches the user query, when understood with open matching of quality criteria that are unspecified. Only trigger patterns (2), (4) and (5) further match the quality criteria. The sponsored results for the matching trigger patterns are ranked by price point and, optionally, by additional factors such realization rates. One might imagine that the sponsors of (4)-(5) would be offer a higher price point for ranking than sponsors (1)-(3), based on deep meaning of the quality factor in the user query.

A key word trigger system would find a partial match on "Chinese" between the user query and sponsored trigger patterns (3)-(5), but no keyword differentiation among the trigger patterns, because "nice" does not match "fine" or "expensive". There would be a partial match on "nice" between the user query and sponsored trigger pattern (2). Natural language trigger (1) would not match at all.

Natural language understanding of deep structure to the five sponsored trigger patterns produces much different overlap in triggering by user queries that keywords in would produce. Simulating ranking is more difficult with natural language understanding of queries and specification of sponsored trigger patterns, because it is the deep structure of the pattern that matters. The example illustrates the difference between deep structure matching and keyword matching. Using deep structure matching in the example requires ranking more results than simple keyword matching.

In some implementations, deep structure is represented by a frame, a virtual data structure associated with an object that has a number of slot-value pairs. Of course, a value may itself be a pointer or reference to another frame, whose slots that may themselves be frames as well as simpler values. Therefore, complex data structures may be built in this way. Concrete implementations of frame data structures can take many forms: property lists, arrays, C structs or equivalent static collections, hash tables, relational databases, AOV triples, and labeled directed graphs. In the graph implementation, edges are labeled with slots names and are drawn from an object to the value of the named slot. In the sequel, we use frame or deep structure interchangeably, although deep structures could in principle be made of multiple frames. We avoid the graph terminology only because it suggests a more loosely coupled data structures, and we tend to look at tightly coupled ones, but the two are really equivalent, and easily converted into each other. Also, we will usually associate frame types with semantic categories.

For example, a frame of type Restaurant might have categories that include an id number, a name, an address (which is itself a frame with several parts), a geo-location (lat-long), a neighborhood, a cuisine, a tel, fax, email and website, a chain_name and chain_id, payment options, hours, and at least 40 more slots-many of which can be left unfilled, that is, either filled with an appropriate default value, or marked absent. The deep structure, then, will consist of the set of all slot-value pairs. Note that one of the obligatory slots is a unique identifier for the establishment.

In some cases, deep structures are created directly, without translation from natural language; this can happen, for example, if a restaurant frame database is obtained by converting the contents of a pre-existing database in another format, or by reusing data already found in a semantic format. Regardless of origin, we will assume that all trigger patterns are available as deep structures stored in a catalog or database. We will restrict our attention to active trigger patterns—the ones that a sponsor is currently enabling.

One new result is using past queries as a yardstick for determining the scope of competition between sponsors' natural language-based triggers. A related new result is being able to predict, in the absence of keyword analysis, how combinations of natural language-based triggers and price points would have fared against past natural language trigger patterns or will fare in the future against pending trigger patterns.

These new problems and results contrast with incumbent keyword-based systems. There are strong reasons for keyword-based triggers to remain in place and adapt to natural language understanding of queries. Sponsored search providers Yahoo, Microsoft and Google generate significant revenue selling keywords. Sponsors are familiar with keyword-based systems. Tools are available for simulating and evaluating ranking of sponsored keyword search results. Even when natural language queries are used, keywords can be found both in the natural language queries and in results of the queries. Keywords could be associated with popular queries or query results. These are motivations for search engine operators to adapt keyword sponsorship to natural language query processing, rather than displacing keywords altogether.

Applying Natural Language Understanding to Trigger Patterns

The technology disclosed brings natural language expression of sponsored result trigger patterns to natural language query processing. Applicant's development team has pioneered a NLU programming language environment, sometimes referred to as Terrier, that supports parsing of natural language inputs and their interpretation as deep structures. This pattern description approach is presented in "An Integrated Programming Framework for Speech and Text Understanding with Meaning Parsing," U.S. Patent Application No. 61/804,934, filed on Mar. 15, 2013, which was incorporated by reference, above. The Terrier NLU processor handles context-free syntax, augmented by arbitrary C++ code. The meaning of an input is represented by its deep structure. In some implementations, the same NLU processing approach is applied both to the understanding of NL queries, and to that of NL triggers for sponsored search results. The decision of whether there is a match is then based, not on the surface structures (text) of the query and pattern—as in keyword-based systems—but on the compatibility of query and trigger deep structures.

Natural language patterns are typically more powerful than keywords. NLU systems rely on both syntax and semantics to process inputs and can create richer, more expressive and more precise structures than keywords do. The presence of a semantic component in particular lets arbitrary computations process and filter possible answers with access to context information and databases or additional knowledge; in contrast, plain keyword matching may be viewed as the weakest form of grammar: a sequence of unordered words, with no syntax and no semantics.

The new problem of keyword inadequacy for triggering sponsored search results when processing natural language queries can be illustrated by contrasting search results from interpreting a query using Terrier patterns, with search results based on keyword processing of the same query. Typical examples of natural language understanding queries might include: finding a restaurant with a particular cuisine near a specified location; searching for a local restaurant that is still open (at a late hour); answering miscellaneous questions, such as tomorrow's weather, stock quotes or converting currency; scheduling a meeting; calling an open pharmacy nearby; etc. In response to such queries, matching (relevant) patterns may be triggered and corresponding messages displayed.

Consider the example of the search query "Chinese restaurant within 2 miles of Lynn Way" issued by a user through a smartphone in Sunnyvale, California. A system using Terrier patterns would accurately respond to this query, using the location "Lynn Way" combined with the physical location of the smartphone to disambiguate the reference to "Lynn Way". Similarly, if the smartphone were at Lynn Way, Apple's Siri system could understand the related query, "find a Chinese restaurant within 2 miles of here", even though at the time of this patent application Siri could not understand "within 2 miles of Lynn Way". The flexibility of natural language understanding is not matched by keyword-based systems.

Keyword-based systems attempt to simulate understanding but do not do well with even short natural language queries. The query above for a Chinese restaurant was issued to Google from a mobile phone with location services enabled. To appreciate this example, one has to know that Lynn Way is in Sunnyvale, California, a town between San Francisco and San Jose, and relatively far from both.

The Google sponsored search and organic results were as follows:
  sponsored listings at the top of the page:
    two expensive restaurants in San Francisco (much too far away)
  sponsored listings on the right side of the page:
    links to: yellowpages.com, local.com, localguides.com, ask.com, wow.com, info.com and other "pass the buck" sites where the query must be repeated
    one Chinese restaurant, but again way too far
  organic results, along with some correct answers, included:
    kfc.com (what sort of Chinese is Kentucky Fried Chicken?)
    restaurants in San Jose, which were much further than two miles away.

This example focuses on relevance and semantics. It illustrates the inability of keyword-based search engines to process a natural language query to extract the precise meaning of the request, and to use a semantic component— in this case, to use the current location context and correct distance semantics to find a suitable (relevant) restaurant to advertise. Many other examples can be constructed in a similar manner to illustrate the frequent superiority of natural language searches over keyword searches.

An auto buying search query shows another aspect of how natural language understanding search is more expressive keyword-based search. In the query "show me a used Mercedes between 2 and 5 years old," the phrase "between 2 and 5" will not be understood by a keyword-based system, both because it is not sensitive to word order and because it does not know about arithmetic. In contrast, a natural language understanding parser knows that "between A and B" is not the same as "between B and A." In Terrier, this would be expressed by a syntax pattern such as "between". (a=INTEGER( )). "and". (b=INTEGER( ))

In addition, the logic attached to this syntax fragment can use simple arithmetic to tell if a value (here, the age of a car) lies between a and b; no such logic is available in keyword-based systems.

Sponsored search problems of overlapping queries and judging equivalence can be illustrated with an additional restaurant example. One example that illustrates overlapping queries is "find me a cheap Indian meal". This query can trigger multiple patterns for sponsored search results, including trigger both "find a cheap meal" and "find an Indian meal". In another example involving both implicit and explicit criteria, the query "what Indian food is nearby" (issued from a smartphone while in Sunnyvale) will have essentially the same effect as "find some Indian food in Sunnyvale" although the details may vary somewhat, with the exact granularity of positions and neighborhoods. If possible, the results will be shown on a map, facilitating choices. In any case, an expression such as "in Sunnyvale" will tend to refer to a region that includes Sunnyvale and some extra territory in the vicinity. Natural language processing can map both queries to meanings whose equivalence or overlap is easily checked. For a franchise, asking "Is there a Dennys nearby" will show a number of Denny's locations within a limited radius, probably on a map, and "Is there a Dennys within a mile?" will get more specific. These examples show how natural language processing of natural language queries and trigger patterns, as possible with the Terrier system, can behave with greater expressiveness and precision.

Natural Language Trigger Patterns for Sponsored Search Results

Applicant determined that more relevant sponsored search results could be delivered using NL trigger patterns than using keywords. In their full expression, NL trigger patterns include the definition of an arbitrary matching function, and have the expressive power of general programming languages. In contrast to the straightforward equivalence of sets of keywords, NL trigger pattern equivalence is hard to test; in general, the equivalence of two natural language pattern recognizers is known in the Theory of Computation to be undecidable. Recognition of this difficulty led to comparing patterns by their 'footprint' in terms of the queries they succeeded or failed to recognize. The techniques used for sets of keywords no longer apply here; there are additional new problems, which we address below. How to simulate impressions generated by new NL trigger patterns and price points when other sponsors' patterns cannot be tested for equivalence? Also, how does context further complicate processing of natural language queries?

Query context can be explicit or implicit. Many queries are self-contained, in the sense that their interpretation is only based on the query's explicit text; it does not depend on implicit context variables, such as time of day, calendar date, geo-location and identity of the user, or on the history of the dialog with a conversational agent. But some queries make implicit references to certain context variables; the choice of an intended response (and possibly an action) by the NLU logic depends on the value of these known context variables. In contrast, trigger patterns that determine sponsored responses may depend on context that the query does not depend on. As a result, the query description conveyed to the recognition and interpretation system will contain (or may contain) the values of available context variables. For example, while a search for a bar does not mention the time of day, the trigger pattern for a potentially matching drinking spot might require that it might be open at the particular time of day.

Conversely, the use of an explicit location or time in a query does not make it dependent on context variables. The query "Find a cheap restaurant in downtown San Francisco that is open until midnight" is without geo implicit context, as it will be matched based on the explicit location given. As to time, there is some ambiguity. The semantic match might check that the restaurant's business hours include midnight, or that it is open between now and midnight—the latter has an implicit context component.

There are various approaches to deciding how much implicit context to collect when sending a query to a server. In one embodiment, a fixed set of context properties is designated for collection (such as, say, geo-location and time-of-day) and transmission with the query. The choice of geo-location granularity (or even the presence of such information) can be controlled by device settings, for privacy reasons. Time-of-day and date are usually available, relative to a time zone. Additional information may be added to the context, depending on the application.

The natural language queries issued y a user, automatically packaged with some context, are sent to a server, which uses a NLU system to convert them to a deep structure, a meaning which may be a web search query, an information query, an action request, and so on. This may be to a search for weather information, an interaction with a travel service, or another 'vertical' application; all of these represent the user's intended meaning—what the user specifically asked for.

Besides acting on the user's intended meanings, an online advertisement system handles in parallel a set of trigger patterns supplied by sponsors. Each incoming query is matched with the active patterns, and those that match are triggered. The treatment of the query context in trigger patterns is the same as that in regular patterns. An automated ranking mechanism is applied to the matched patterns, using one of the familiar pricing and ranking systems based on price points: CPM, CPC using max bid, CPC using max bid times quality score.

A real-world system that implements sponsored search results manages large numbers of sponsors, stores many trigger patterns and messages, and handles many users and queries over time. The system can remember the history of a user's past activity to improve user-specific results, either in its entirety or with selective forgetting or with a suitable summary of past events.

In one implementation, the history H of past matches may consist of some or all the pairs (P, Q) where a pattern P was triggered by a query Q, and neither P nor Q were forgotten. Such a history may be stored in a number of different of ways. To save space, the system may simply accumulate frequency counts for each distinct pair (P, Q). It thus gives access to the number of times query Q was seen, the number of times pattern P was seen, and the number of times P was found matching query Q. This stored version of the history is sometimes referred to as a history log or just a log depending on context.

In some implementations, frequency counts may be replaced by amortized counts, where the older occurrences of a match receive a decreasing weight; the use of an exponential decay yields a very simple and fast implementation, often referred to as a leaky integrator. Patterns, queries and pairs whose decayed frequency average fall below a certain threshold may be forgotten, e.g., dropped from the log or ignored when the log is processed. In other implementations, frequency counts may be collected for specific time periods, such as months or weeks, postponing the optional choice of either a decay parameter or a time window of interest. Some alternative data structures that can accumulate frequency information are illustrated below.

The technology disclosed does not depend on specific choices of statistics reported, important as these choices may be in practice. Any of the techniques described may be used. For queries Q, we log and have access to the set of trigger patterns $Mp(Q)=\{P[i]\}$ that matched Q in the remembered past (with corresponding frequencies) and conversely for patterns P we can index and have access to the set of queries Mq(P)={Q[j]} that matched P in the remembered past (with corresponding frequencies).

Each sponsored message A is associated with a price point, B, and a trigger pattern P. The rank score R may simply be the price point B, or a price point modified by a multiplicative quality score or conversion factor, or some alternative definition of the rank. The rank score may be recomputed or stored along with A, B and P.

Let us review how messages are chosen for presentation to the user (e.g. on screen, via audio, etc.) in response to a query Q. In one implementation, we find the set of patterns that match the query and the sponsored messages triggered. If query Q is known from the past, this set can be retrieved easily from a history log; otherwise we find its trigger pattern matches by enumerating the set of sponsored patterns. A possible optimization of the enumerative process involves using a prior partitioning into distinct patterns, as available in the history; other optimizations can be applied.

Next, the matched trigger patterns and associated sponsored messages are sorted by decreasing rank, and the system selects for presentation the first messages in order of rank, as long as there are available slots. For example, a given result page might only have one slot to present a sponsored message while another result page might have three or more.

The position of a message among the sponsored results will depend on the set of trigger patterns that match query Q, and on the price points or ranking score of the associated messages. Since sponsors can modify their sponsorship at arbitrary times, including the trigger patterns and price points, the winning messages are the result of a continuous online ranking evaluation.

The technology disclosed simulates competition between natural language understanding expressions used to trigger message display, as opposed to keyword auctions. There is a need for a tool to help sponsors analyze the competition for prominent ranking of messages. When adding a new trigger pattern and message into the system, they need to understand when their message is likely to be ranked in sponsored results at a specific price point. This lets sponsors choose their price points in a more informed manner. When an advertiser wants to change the pattern for an message or change the price point, essentially the same tool supports acquiring the needed information, so we can focus on the case of adding a new message A* with pattern P*.

Suppose the existing messages are A[1], . . . , A[N], with price points B[1], . . . , B[N], patterns P[1], . . . , P[N] and ranks R[1], . . . , R[N]. These are the known competing messages. Let's assume they are sorted by decreasing order of rank; since equal ranks are possible, we have R[1]>=R[2]>= . . . >=R[N]. We wish to inform the sponsor of the effects that the choice of a specific price point will have on the position of the new message A*, or the expected number of impressions and related metrics.

We have access to the set of distinct queries known to the system history, and their frequencies. For each unique query Q[i] in the set, we know what trigger patterns and messages it has matched in the past. Note that the highest ranking pattern that matches query Q[i] can be computed on the spot, by enumeration of all patterns; alternatively, this information may be cached in the history data structure; or we can enumerate only unique patterns. Again, optimizations can be applied, that are consistent with the technology disclosed.

The method used to generate the competitive information for a new P* is as follows. The first step will generate sets of queries. Subsequent steps will present or summarize these sets of queries for the sponsor.

As P* is a new trigger pattern, we compute the set Q* of queries that P* matches. We construct it by selecting, from a set of known queries, those that match P*. More discussion of how to determine matches appears below. As we build this set Q* of distinct queries, every query Q*[i] in it keeps its frequency from the history. We can also associate with Q* the winning rank R*[i], which is the highest rank among all the sponsored trigger patterns that match Q*[i]. We sort the list of pairs (R*[i], Q*[i]) by decreasing values of the rank. In general, there will be sets of queries with the same price point; to handle this frequent situation, we can replace the sorted list of pairs (R*[i], Q*[i]) by a new sorted list of pairs (R*[j], Q*[j]) where QS[j] is the set of all queries that have the same winning rank R*[j]. That is, we have collapsed successive rows with a shared rank. Now we can guarantee that the successive rank values will be distinct: R*[1]>R*[2]> . . . >R*[K], but they will be associated with sets of queries.

Based on the analysis so far, we can give a sponsor with new message A* (who has entered P* as a new pattern and price point B*) the following information, which is rank-based:

if R>R*[1], trigger pattern and message (A*, R*, P*) receives top placement; the system can give query examples starting with Q*[1]; then Q*[2], etc. else:

if R>R*[2], the message A* will receive intermediate placement (with examples from Q*[1]) and win some others (with examples starting with Q*[2]; then Q*[3], etc. else:

etc., going down the list by rank, until we get to the bottom price point, below which sponsor A* will not see its message displayed.

Since we have query frequencies for all queries, we can easily find the joint frequency of each set Q*[j] of queries that match P*, let's call that F[j]. Computing the sum F of the F[j] values, we can normalize the counts to probabilities F[j]/F or to percentages. Below, assume we have replaced F[j] by F[j]/F so we are working with probabilities.

By cumulating probabilities we can determine what fraction of the traffic for pattern P* will be captured by R:

if R>R*[1], that is 100%, or 1.0;

else if R>R*[2], that is 1.0−F[1];

else if R>R*[3], that is 1.0−(F[1]+F[2]); etc.

In the simple case where the rank is simply the maximum price, the above analysis is sufficient to give a sponsor the desired information about what price point to choose. But the case where a message's rank is computed by multiplying the price point by the quality score or other conversion factor is more involved. When the message actually pre-existed (that is, we are only modifying the message's trigger pattern or the price point of sponsorship for the message), the message's quality score is already known. Then, we can obtain the ranking factor by a simple formula, such as: B=R/S where S is the already known quality score of the message.

When a message is brand new, there are heuristics to help to determine an approximate quality score, and the system can convey their outcome, as well as the uncertainty that is attached to it. Part of the quality score is based on factors that are known (or can be determined) upfront, and other components can be statistically estimated. Such heuristics can be adapted from prior art systems; there is extensive documentation of how the AdWords system, for example, deals with these issues. A simple option always available to sponsors, of course, is to start with a price point that gets some exposure to the ad, and then to get a quality score based on early performance.

A dedicated sponsor will not be content with just traffic, but will want to check what type of query is gained or lost by moving R to the next value up or down. To help with this, we supply a summarization method, one implementation of which is to list the queries in each set Q*[j] in decreasing order of their frequency. The sponsor might specify how many queries to list, get a complete file for detailed analysis, or receive a sorted multi-page display similar to the result list of a search engine, where users often scan only the first page, but may look further down.

Some of the principles and technology discussed above are reviewed in the context of figures below.

FIGURES

Figure 1:
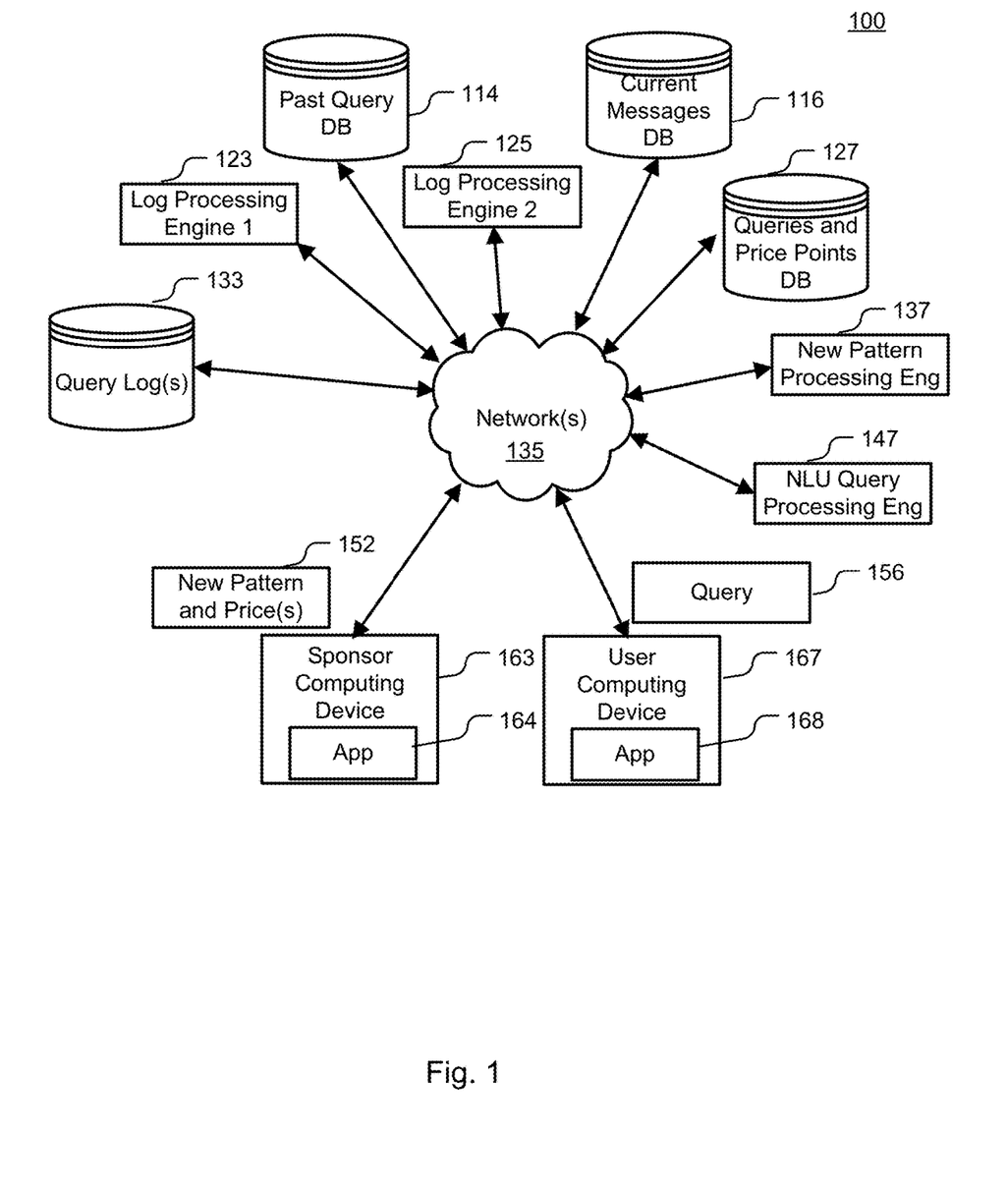
FIG. 1 illustrates an environment in which the technology disclosed can be implemented.

FIG. 1 illustrates one environment 100 in which the technology disclosed can be implemented. Some implementations of the technology disclosed solve one or more of the problems identified. Other implementations can be applied to problems not described, optionally addressing the problems identified.

In FIG. 1, a query log 133 is the source depicted for past queries. When a user computing device 167 running an application such as a browser or personal assistant app 168 sends a query 156 via a network 135 to a natural language understanding query processing engine 147, one or more entries in the query log(s) 133 are created.

The query log 133 includes at least one price point at which past ads were triggered for display in response to a query instance, such as the highest, lowest, median or average price of ad triggered. It may include multiple price points of ads triggered by a query instance. The price points can be either price bid or price payable, especially when the click through price payable by a sponsor is the price of the next lower placed sponsored result in the list, rather than the sponsors' own price. The price points can be chosen for impressions, click-through rates, or follow-through actions. When the price point(s) are for click-through rates or follow-through actions, price point log entries can be paired with expected revenue ratings or conversion rates, so placement of messages in the query log 133 reflects combined price and likelihood of click-through. Log entries also may correlate price points with ranking or placement of sponsored results.

Log entries also may further include references to the natural language pattern(s) matched by the query and the messages triggered for display. Log entries may include ad click through events following queries.

Log entries also can identify the corresponding deep structures, or the object IDs that allow access to them. For instance, a restaurant's frame may have dozens of slots available to characterize a particular eatery. A query's deep structure can be used to drive access to a restaurant database. Some sponsored patterns set fewer attributes than a query that it intends match, as illustrated above.

In case of an spoken query and a natural language understanding pattern triggered without translation of the audio into words, the query can be represented by either the natural language understanding pattern selected as best representing the query or by text reconstructed based on the selected natural language understanding pattern.

A first log processing engine 123 processes the query log 133 to produce a past query database 114. In one implementation, this log processing engine 123 counts past queries to produce frequencies. It can summarize past successful patterns and price points by making distributions such as histograms or parametric distributions of past successful patterns, based on price points in the log of sponsored patterns triggered by past queries.

A past query database 114 organizes a set of past queries for processing. Queries have frequencies and price points. The historical price points can be stored as price distributions. These distributions may change over time applying rolling and/or weighted selection of past data. For instance, the last 15 or 30 days of queries or the last 100 or 1000 or 10,000 instances of a query can be incorporated in a distribution. Within a distribution, more recent instances can be given more weight that distant ones. Multiple data points can be maintained to track change over time, which can support trending.

Figure 2:
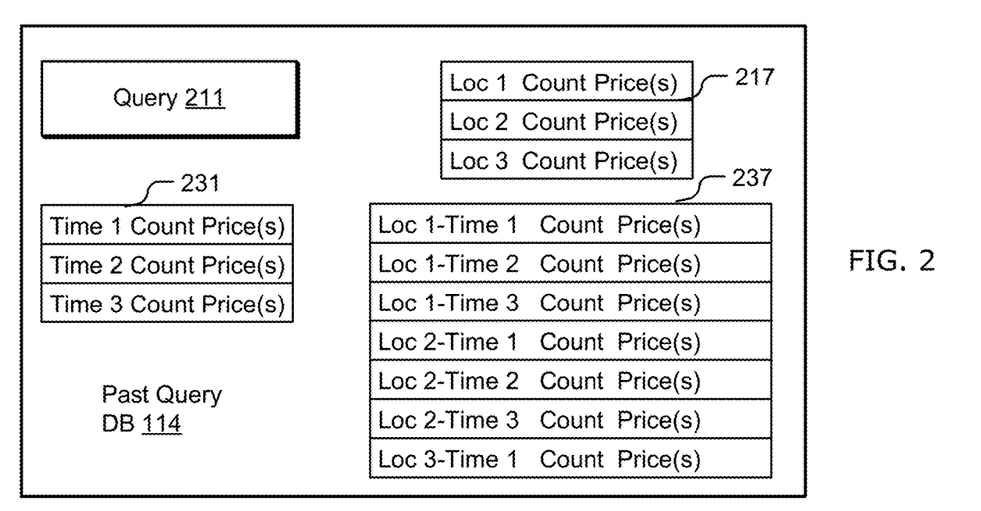
FIG. 2 illustrates alternative implementations of a query entry with criteria in the past query database.

In one implementation, a primary part of a query, such as "a Chinese restaurant" can be combined with multiple further criteria, such as locations or time of day queried, and each criterion has a separate price point or distribution. A criterion may be explicit, as "within two miles of Lynn Way" or implicit from a GPS signal or time of day that the query originated. FIG. 2 illustrates alternative implementations of a query entry 211 with criteria in the past query database 114. In the database, criteria such as location or time can have categorical representations such as zip code or Yahoo's 32-bit location code (Where On Earth ID) or they can have a more precise, nearly continuous representation, such as latitude and longitude. Multiple criteria such as location and time of query can be treated as independent variables and stored as individual distributions 217, 231 or can be treated as joint distributions 237. Or multiple criteria can be treated as conditionally independent query variables given similar contexts, such as dining times in large cities, suburbs, small towns or rural areas. A limited number of secondary contexts can be used to reduce the storage required for joint distributions of primary and secondary criteria variables.

A collection of data for query 211 can be stored in a single table in a database or as a single data object. Or, the collection of data can be decomposed into multiple tables or data objects linked to primary query data 211. The criteria specific data 217, 231, 237 can be linked by a pointer or other reference or by a shared key.

Returning to FIG. 1, a active messages database 116 organizes sponsored patterns and prices for processing. At least one price point accompanies a sponsored natural language trigger pattern. Sponsored patterns can have trigger pattern criteria, effective dates, and expirations. The criteria can, for instance, be location or time of day sensitive or viewer-related.

A second log processing engine 125 processes the active messages database 116 against a set of past queries from the past queries database 114 to produce the queries and price points database 137. In one implementation, the second log processing engine 125 counts past queries to produce frequencies. In another implementation, the past query frequency is already available. The second log processing engine simulates triggering of active ads by the past queries, for instance by processing past queries against active ad trigger patterns.

In one implementation, the second log processing engine 125 operates on the deep structure of past queries. In this implementation, past queries are translated into an internal data structure suitable to generating a query against a fielded database. These translations can be stored in the query log(s) 133 or generated by the second log processing engine 125 from query 156 text. In some implementations, the deep structure of past queries can be organized in a hierarchy, based on specificity of the query and distributions can be compiled for different levels of the hierarchy. This could be practical in a subject-oriented natural language processing application, even if it is impractical for a generic search engine.

Results of the second log processing engine 125 replaying past queries include frequencies and price points as described above. The price points can be stored as price distributions prospectively. Price distributions may change over time as sponsorships become effective and expire. The second log processing engine 125 also can be applied to the active messages database 115 to make distributions of active message price points for active patterns triggered by simulated queries. It can track the patterns and messages triggered by replay of past queries, as described above for compilation of the past query database 114 by the first log processing engine 123.

The queries and price points database 127 records projected results of past queries replayed against active patterns and price points to predict future price distributions. The set of past queries that is processed against active patterns may be limited by time, criteria, frequency or other query property. The processing can involve multiple criteria. It can take into account effective dates, expiration and/or quota fulfillment of active bids.

Processing can be performed periodically to update the queries and applicable bids database 137 as the active messages database 116 evolves. Processing can be updated on demand for a subset of queries or families of queries that trigger a pattern under analysis. In this context, a family of queries includes a primary part of the query that triggers the pattern under analysis.

As described above for past messages and queries, pending natural language queries and past queries can be organized by a primary part and further criteria.

A new pattern processing engine 137 processes at least one new trigger pattern and at least one price point 152 against the past query database 114, the queries and prices database 127, or both databases. It can process the new trigger pattern 152 against a variety of criteria and/or a range of prices. This engine 137 determines the queries triggered by the new pattern.

In one implementation, the new pattern-processing engine 127 operates on deep structure of past queries 114, active messages 116 and new patterns 152. In this implementation, past queries, active message triggers and new patterns are translated into an internal data structure suitable to generating a query against a fielded database. Rules are supplied by default and/or by sponsors for treatment of fields or attributes of the internal data structure that are specified in one but not the other—for instance, if the new pattern is for "cheap restaurants" and the past query is for "cheap Indian restaurants", does the query trigger the new pattern or not? An internal representation of a new pattern expressed in natural language is associated with such matching rules, which we discuss later.

The new pattern processing engine 137 compiles statistics for the triggered patterns. It simulates one or more price points for the new trigger pattern against past price points, active price points, or both. It determines the messages triggered by a query and compares a price point for a particular trigger pattern to a price distribution that reflects past successful messages triggered by the query and/or active messages triggered by the query.

An interface generation engine (not shown), in some implementations, accepts statistics compiled by the new pattern processing engine 137 and formats them for display by an sponsor's computing device 163, 164. For instance, it generates HTML, XHTML or XML to be further processed by a browser or other application 164 running on the advertiser's computer 163.

The statistics include at least an estimated frequency or volume of queries that trigger a new pattern. Other statistics describe below also can be estimated and reported. The statistics reflect responses to natural language understanding queries, as opposed to keyword queries.

Figure 3:
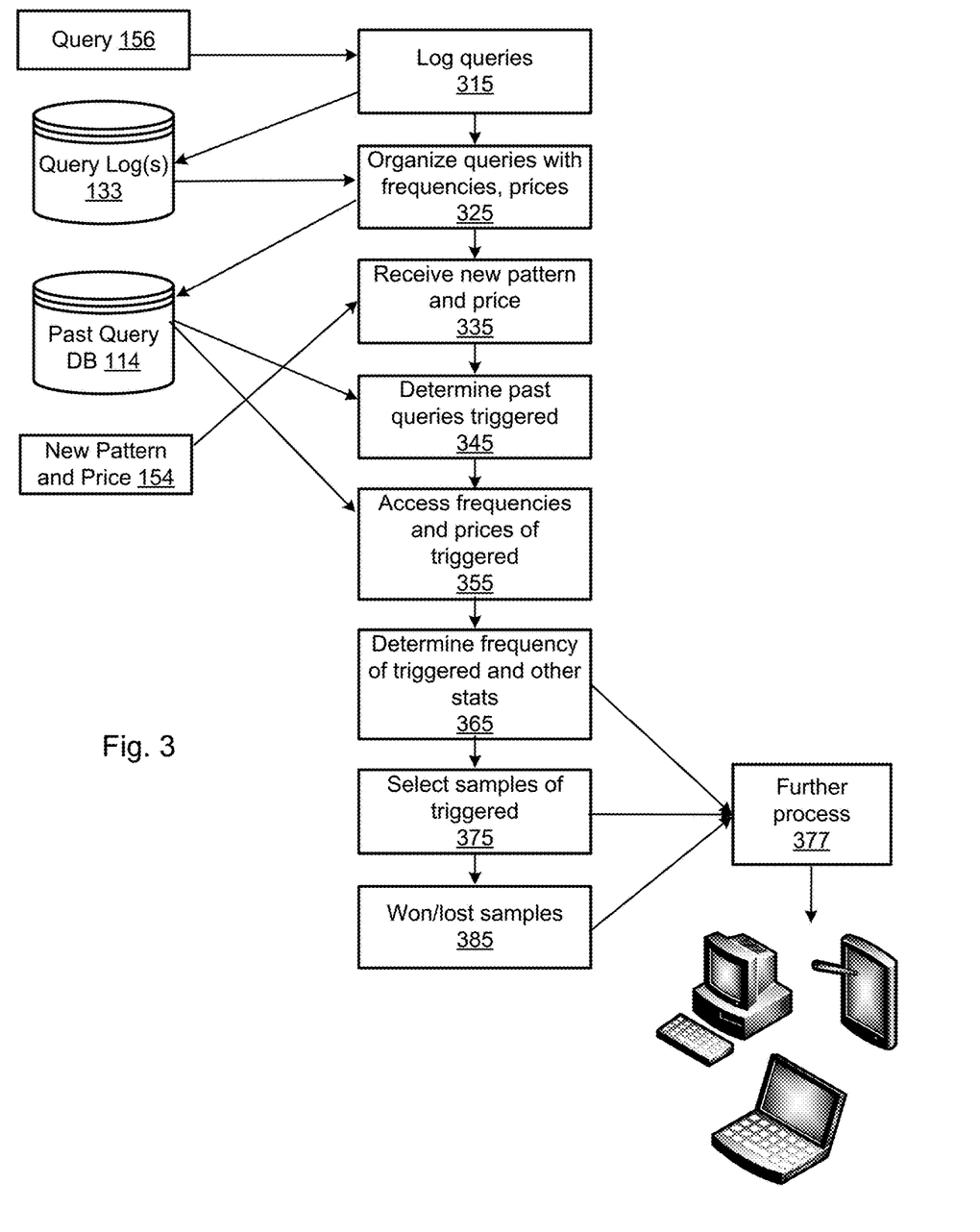
FIG. 3 is a high level flow chart of matching trigger patterns to past queries to simulate and report on ranking and placement of sponsored results against a replay of past queries and past sponsorship rankings.

FIG. 3 is a high level flow chart of matching trigger patterns to past queries to simulate and report on ranking and placement of sponsored results against a replay of past queries and past sponsorship rankings. While the process illustrated is described for ease of understanding by reference to the system in FIG. 1, it should be understood that the process is computer implemented but does not depend on any particular system. Similarly, while the overall flow is described with reference to a number of blocks, the number of corresponding processes can be more or less than the number of blocks. A single process could carry out all of the actions in the flow chart, though such a large process is not encouraged by current programming practices.

In the figure, a natural language query 156 is received. A process logs queries 315 to one or more query logs 133. Periodically or even continuously, a process 325 organizes the queries from the query log(s) 133 into a past query database 114. The database may be organized using any of the structures in FIG. 2. Redundant or stemmed queries can be consolidated with frequencies recorded. Exponential decay can be applied or historical buckets used, as described above.

A process 335 receives at least one new pattern and price point(s) 154 for a sponsored result message. This trigger pattern could previously have been used with a new or renewed message. This trigger pattern and price point(s) are the subject of further processing 345, 355, 365. A process 345 determines which of the past queries would trigger the trigger pattern. Frequencies with which past queries have triggered trigger patterns, and at what price point, can be compiled.

For the past queries, frequencies and prices of trigger patterns invoked in the past can be accessed 355 from the past query database 114. Frequencies of triggered patterns and other statistics of interest such as ranking of the sponsor's price point against price distributions of patterns triggered and corresponding sponsored messages are determined 365. These statistics can be forwarded to a further process, such as 377.

Samples of queries that triggered 375 the trigger pattern can be selected. These samples can, for instance be organized by frequency and can be grouped by stem. Samples of queries that trigger the trigger pattern can be forwarded to a further process, such as 377.

Samples of queries for which the trigger pattern and message would rank high enough to be displayed 385 can be selected. Samples of queries for which a trigger pattern and price point either win or lose placement can be selected. These samples can, for instance be organized by frequency and can be grouped by stem. Samples of queries won and lost by the trigger pattern and price point can be forwarded to a further process, such as 377.

The further process 377 can assemble a display of results to forward to a user device such as a workstation, tablet, smartphone or laptop. The user device can display the results to a prospective sponsor.

In this sequence of actions, a new trigger pattern, price point(s) and message can be compared to past trigger patterns and price points to simulate ranking and placement of the message using the new trigger pattern at the proposed price point(s). A similar sequence of actions can simulate ranking and placement against active sponsorships, as illustrated in the following figure.

Figure 4:
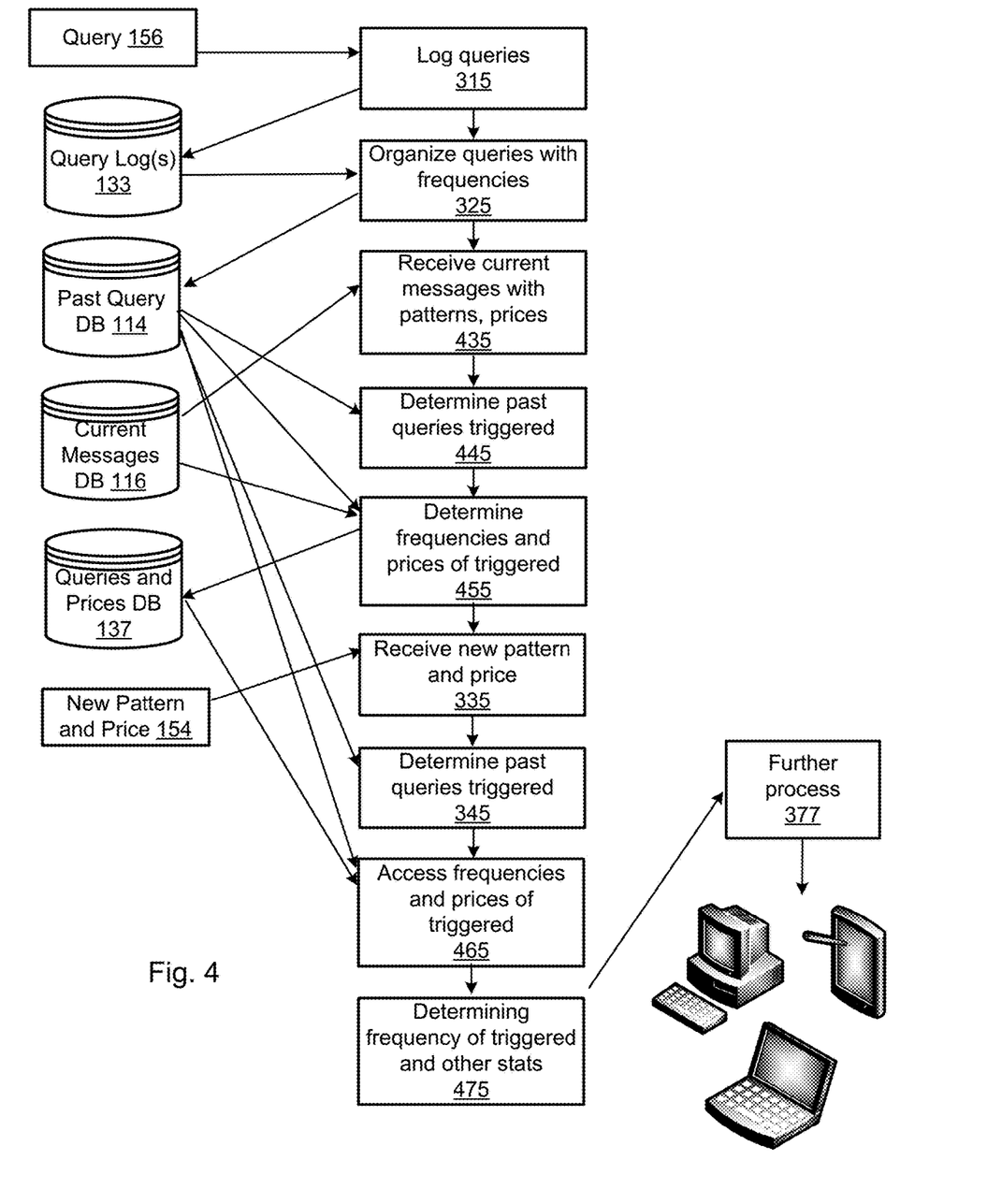
FIG. 4 is a high level flow chart of matching trigger patterns to past queries to simulate and report on ranking and placement of sponsored results against active sponsorships.

FIG. 4 is a high level flow chart of matching trigger patterns to past queries to simulate and report on ranking and placement of sponsored results against active sponsorships. While the process illustrated is described for ease of understanding by reference to the system in FIG. 1, it should be understood that the process is computer implemented but does not depend on any particular system. Similarly, while the overall flow is described with reference to a number of blocks, the number of corresponding processes can be more or less than the number of blocks. A single process could carry out all of the actions in the flow chart, though such a large process is not encouraged by current programming practices.

In the figure, a natural language query 156 is received. As before, a process logs queries 315 to one or more query logs 133. Periodically or even continuously, a process 325 organizes the queries from the query log(s) 133 into a past query database 114. The database may be organized using any of the structures in FIG. 2. Redundant or stemmed queries can be consolidated with frequencies recorded. Exponential decay can be applied or historical buckets used, as described above.

For active sponsored messages, trigger patterns and price points, a process 435 receives active sponsorship information from a active messages database 116 and determines past queries that trigger the active sponsored messages 445. This can be done on demand or periodically. The period of update may be scheduled, adapted to a number of sponsorship updates made or a mix of both. Frequencies with which past queries would trigger active patterns and price points can be determined 455.

A process 335 receives at least one new pattern and price point(s) 154 for a sponsored result message. This trigger pattern could previously have been used with a new or renewed message. This trigger pattern and price point(s) are the subject of further processing 345, 465, 475. A process 345 determines which of the past queries would trigger the trigger pattern. Frequencies with which past queries have triggered trigger patterns and price point can be compiled in the queries and prices database 137.

For the active sponsored messages, frequencies and prices of trigger patterns invoked by the past queries can be accessed 465 from the queries and prices database 137. Frequencies of triggered patterns and other statistics of interest such as ranking of the sponsor's price point against price distributions of patterns triggered and corresponding sponsored messages are determined 475. These statistics can be forwarded to a further process, such as 377.

Not illustrated in FIG. 4, but paralleling the prior figure, samples of queries that would trigger the new trigger pattern 154 can be selected. These samples can, for instance be organized by frequency and can be grouped by stem. Samples of queries that trigger the trigger pattern can be forwarded to a further process, such as 377.

Also paralleling the prior figure, samples of queries for which the trigger pattern and message would rank high enough to be displayed can be selected. Sample of both queries for which a trigger pattern and price point win placement and are unsuccessful at placement can be selected. These samples can, for instance be organized by frequency and can be grouped by stem. Samples of queries won and lost by the trigger pattern and price point can be forwarded to a further process, such as 377.

In this sequence of actions, a new trigger pattern, price point(s) and message can be compared to active sponsored trigger patterns and price points to simulate ranking and placement of the message using the new trigger pattern at the proposed price point(s).

Parallel Processing of a Query Through Intended and Sponsored Results

Figure 5:
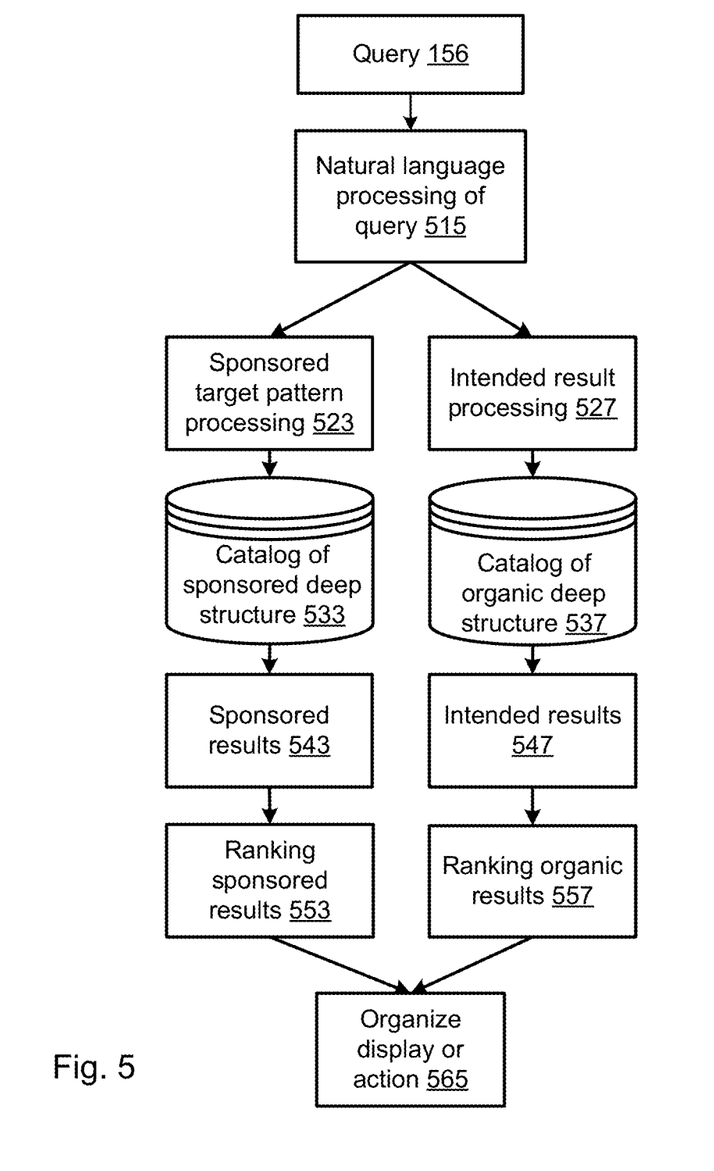
FIG. 5 illustrates processing of natural language queries to produce intended results and sponsored results in parallel.
Figure 6:
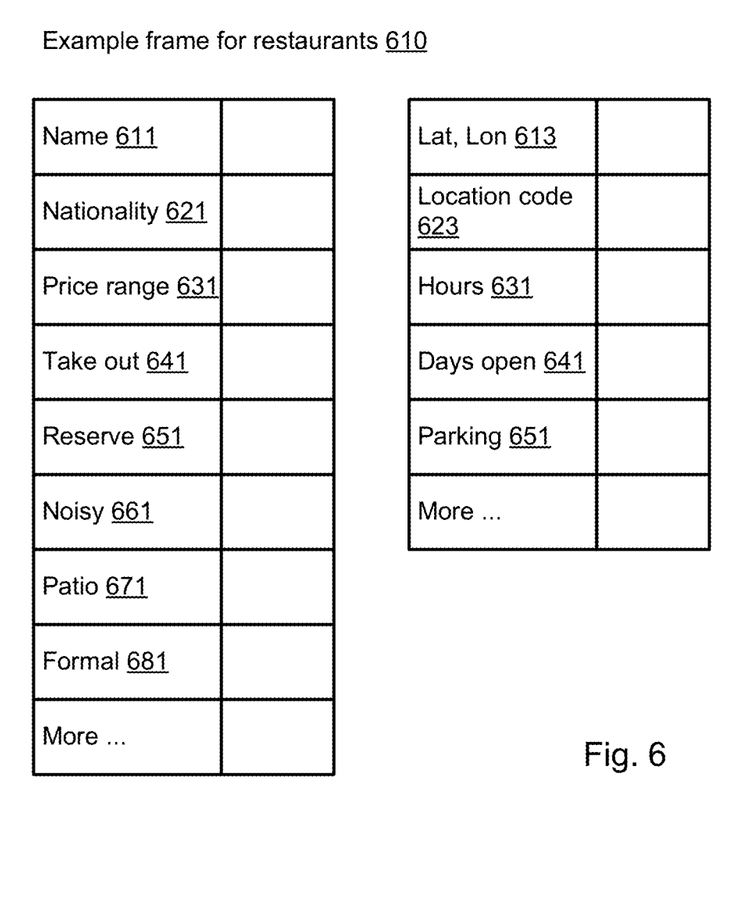
FIG. 6 is a simplified example frame for restaurants.

FIG. 5 illustrates parallel processing of natural language queries to produce intended results and sponsored results. While the prior figures and explanations have focused on search results, in this figure we illustrate a slightly more general situation, that addresses other needs of virtual agents. A query may be action oriented rather than search result presentation driven. Examples include finding a taxicab, scheduling a conference call, finding local pharmacies or non-urgent medical help, and other functions that might be handed over to a conversational agent, a.k.a. virtual agent or virtual assistant. FIG. 6 is a simplified example frame for restaurants 610. An actual database for restaurants may have 40-60 attributes for each restaurant and the frame could have slots for all of those attributes. This example frame includes restaurant name 611, nationality of cuisine 621, price range 631, whether takeout is available 641, whether reservations are available number 651, whether the atmosphere is noisy 661, whether the restaurant has a patio 671 and whether the restaurant is formal 681. This example further includes the latitude and longitude of the restaurant 613, a location code 623, hours of operation 631, days that the restaurant is open 641 and the availability of parking 651. More attributes can be provided in the frame.

Frames can be used to refine sponsor's trigger patterns. In the restaurant example, a frame might include constraints on the query context, such as a distance criterion from the query geo-location. The handling of query context can be separately specified for explicit and implicit context. For explicit or mixed context, the trigger pattern could match San Francisco, or ZIP Code 94111, or within a specified radius of the restaurant's latitude and longitude. For implicit context, the trigger pattern could match any request made within a specified radius of the restaurant's latitude and longitude. Similarly, the trigger pattern frame for sponsorship can include a time of day that the request is received. A trigger pattern for the breakfast and lunch eatery could be effective from 6 AM to 2 PM, but not in the late afternoon or evening. Such a trigger pattern might handle implicit and explicit context similarly.

The trigger pattern frame also can specify handling of absent or over specified fields. For instance, a target frame sponsored by a "cheap restaurant" could specify that the nationality the cuisine 621 would be ignored. The target frame sponsored by an "expensive Indian restaurant that takes reservations and has a formal dining room" could match queries that did not specify whether reservations are available but require a match for the nationality of the cuisine 621 and the price range 631 of the restaurant.

In some implementations, the natural language specification of the trigger pattern would be translated into a frame 610 and a frame would be made available for the sponsor to view options and unselected attributes via a user interface. A sponsor could edit attributes, handling of context and handling of absent or over specified fields by interacting with a graphical representation of the frame. During editing or afterwards, the sponsor could have the option to view a natural language representation of the pattern; such 'reverse parsing' or 'text synthesis' is straightforward for frames, and feasible for more complex deep structures.

Returning to FIG. 5, a query (together with its context) is received from a user and sent to a parser/interpreter that applies natural language processing to extract its meaning 515. The attempt at extracting the meaning of the query may fail, due to syntax or semantic errors. If the parse is successful, we now have the query's meaning as a deep structure representation, such as a frame as defined above, or a more complex structure such as a graph. Note that some of the frame (or graph) value slots (the choice of which may be determined by the vertical application) will be determined by or extracted from context variables and placed into the deep structure. For example, the vertical might keep separate slots for an explicit location (stated as part of the query) and an implicit location (from GPS) or it might merge the two in a single location slot, giving priority to the explicit location and using the implicit location as a backdrop. The process just described results in filling out the meaning of the query, represented as a deep structure.

The deep structure that results from natural language processing is sent along to paths 523, 527, which are logically processed in parallel. The path for intended result processing 527 is the one that interprets and acts upon the intention of the user, such as searching the web, finding a restaurant, converting currency, scheduling a meeting, canceling an appointment, calling a contact, etc. The path for sponsored trigger pattern processing 523 acts on behalf of sponsors and returns sponsored results. The two processing streams are separate.

The two processes may run in parallel and even on different sets of servers. The flow is under control of a master process that integrates results and in particular chooses what actions to request from the user's device and UI, and at what time.

In some implementations, intended result processing 527 compares a deep structure resulting from the natural language processing 515 to a catalog or database of such deep structures 537. Intended results 547 are selected and ranked 557. Expression and processing of queries to a vertical application is further discussed in the "An Integrated Programming Framework for Speech and Text Understanding with Meaning Parsing" application 61/798,526 that is incorporated by reference above. The sponsored trigger pattern processing 523 generally parallels the intended result processing 527, with some potential differences on matching the deep structure, as mentioned above.

A number of sponsored trigger patterns may be active in the online system. Each sponsored message has many properties, including the trigger pattern and price point, but also a message appearance, a landing page, etc. The trigger pattern is what the system uses to decide whether a sponsored result is relevant to a query. How is a trigger pattern defined, and how is the relevance decision made?

A trigger pattern usually assumes that a specific object category drives its top-level frame type (such as an eatery) and this is typically associated with a vertical search. The pattern only deals with slot values defined in that vertical's top level frame, although frame types have subtypes according to a taxonomy of object categories. Of course, slots may have values from different frame types. For example, a "Reminder" frame may point to one or more "Date" frames.

In its most general form, a trigger pattern is an arbitrary predicate on a query's deep structure. This global predicate is often formed as the 'and' of individual predicates (constraints) on individual slots in a query frame, and the pattern matches if all slots are matched or have values that satisfy a compatibility rule, as discussed above. Absent slots can have no attached constraint, so they 'match' and are ignored. Each slot with a value is checked to see if it meets whatever constraint is imposed by the pattern on that slot value. Constraint matching is normally done by default functions (for each slot or slot type) according to parameters: (1) parameters that represent the specifics of the sponsorship; and (2) general processing parameters, such as modes, flags and thresholds.

Returning again to a restaurant example, we illustrate some common types of constraint. These illustrations are not intended to be exhaustive. Restaurants have a large number of descriptive slots that come from a restaurant database used by a restaurant vertical application. Any restaurant that is a sponsored result may be automatically added to the restaurant database if it is not initially found there. The database includes an object (deep structure or equivalent) that represents a sponsored restaurant, with values for most or all slots of the vertical. This specific restaurant is the 'target' sponsored result. A message regarding the sponsored result (e.g., a restaurant) is triggered by the sponsors trigger pattern and price point(s). The frame for the sponsored result obeys the structure of the vertical application database.

A process 523 matches trigger patterns to results of the natural language processing of the query 515. This is done in the semantic domain, which is to say that the query's meaning (a deep structure which refers to values or conditions on values) is matched with the target's deep representation (a similar structure but where most slots are usually filled out with plain values.) The access to the frames representing the deep structure 533 of sponsored trigger patterns may be done through a catalog.

In one implementation, matching of simple frames is performed one slot at a time between query frame slots and corresponding target frame slots. In an alternative implementation, a custom matching function could be used to compare the query's meaning with the entire target's frame; this is not likely, due to the fact that it is more complex, and that slot-based matching will usually perform the task well. Slot-based matching typically uses default functions for each slot, or each slot type. The sponsor's pattern has the option to override default slot matching functions with custom ones.

In a more general implementation using (say) graphs, a process of graph matching or unification is used to decide if there is a match. Again, there is a default matching process, with the option of changing some parameters or overriding certain components of the match.

While the default behavior for an absent query slot is to succeed in matching, the default for an absent target slot (when the query slot) is present might be a failure. For example, if a restaurant is noisy but the user's query says nothing about noise level, there is a match. On the other hand, if the query asks for a quiet restaurant and the target restaurant has no information about noise level, there is a risk that a noisy place would show up in an ad, hurting relevance. The default matching plays it safe; this can be easily overridden. In another embodiment, an absent target value lowers the rank of the result rather than preventing a match.

For another example of matching, a sponsored location may be matched with the user's requested location by using a default distance parameter. Standard techniques include bounding boxes and the use of a time or distance radius from the sponsored location. A query for a fancy restaurant in SF or in the California wine country might override the default with a large distance (thought process "people will come from far away to eat here") while a small neighborhood restaurant will use a small radius, which may be the default. A franchise might pick its radius based on the density of its locations or a size of map that will display the locations. (Think of how a coffee chain might offer options in Seattle vs. mid-Michigan.) Default processing can be configured to handle multiple locations, e.g. a franchise; zones defined by a radius in miles or drive time or walking time; neighbor cities, zip codes, regions, etc. Any special handling of franchises only needs to be coded once. As a result, there may be little need for the advertiser to custom-code its location matching needs, beyond the use of pre-coded default functions, and the possible setting of a distance parameter.

The same is likely to be true of time-related matching. A restaurant will have hours when it is open on specific days of the week; there may be exceptions, holidays and otherwise; these call for complex expressions of time ranges. Nevertheless, query slot values that express, e.g., 'open on sunday' or 'open after midnight' can be successfully tested against complex target hour descriptions by default time range matching methods.

We can illustrate the handling of multiple alternative values using the type of food prepared. If the query asks for 'European food' and a target serves French cuisine, there will be a match. In a more explicit case of disjunction, a request for 'Chinese or Vietnamese' will match a target that either 'Vietnamese' or 'Cambodian' food types listed.

In summary, constraint matching is normally performed by comparing non-empty query slot values with target values, using default functions for each slot value in a frame or deep structure (or each slot type), possibly with custom parameters used for a specific ad. Sponsors can be given the option to override individual slot constraints, or even the entire matching predicate. At a base line, a sponsor can use natural language to specify values of slots in the frame to be matched. Optionally, requirements on matching also could be specified for slots. Using natural language or combining natural language with an interface for editing slots in a frame, sponsors do not need to do any programming to specify how natural language queries should trigger sponsored messages.

Once we know what patterns, if any, match the query 543, we run an online ranking process 553, in one of the familiar ways, ranking the relevant sponsored trigger patterns to decide which corresponding sponsored results and messages will be shown. The winning ads are handed over to the master process 565. From the user intention side 527, organic results (for a web search or generally an information request) or action sequences (for a command such as calling a number or sending a SMS message) are also handed to the master process 565, which passes on data from either side, suitably merged and/or synchronized, to the user's device. Various side effects may also affect the state of the server systems.

Computer System

Figure 7:
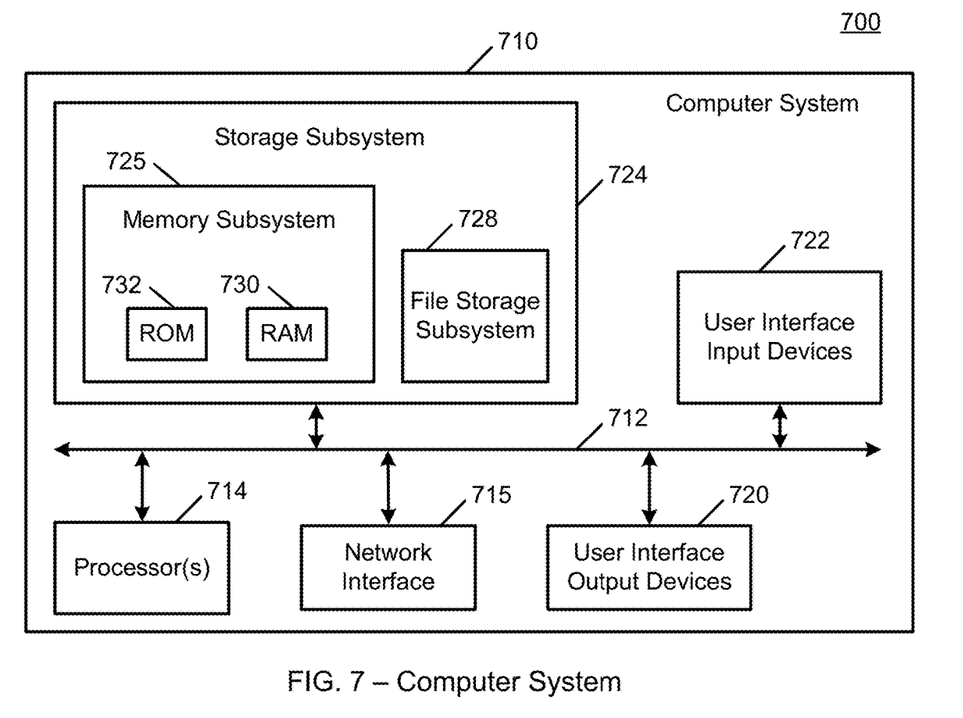
FIG. 7 is a block diagram of an example computer system 700 for natural language processing of sponsored trigger patterns.

FIG. 7 is a block diagram of an example computer system 700 for natural language processing of sponsored trigger patterns. FIG. 7 is a block diagram of an example computer system, according to one implementation. Computer system 710 typically includes at least one processor 714 that communicates with a number of peripheral devices via bus subsystem 712. These peripheral devices may include a storage subsystem 724 including, for example, memory devices and a file storage subsystem, user interface input devices 722, user interface output devices 720, and a network interface subsystem 716. The input and output devices allow user interaction with computer system 710. Network interface subsystem 716 provides an interface to outside networks, including an interface to corresponding interface devices in other computer systems.

User interface input devices 722 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 710.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules and methods described herein. These software modules are generally executed by processor 714 alone or in combination with other processors.

Memory 726 used in the storage subsystem can include a number of memories including a main random access memory (RAM) 730 for storage of instructions and data during program execution and a read only memory (ROM) 732 in which fixed instructions are stored. A file storage subsystem 728 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 728 in the storage subsystem 724, or in other machines accessible by the processor.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as one example. Many other configurations of computer system 710 are possible having more or fewer components than the computer system depicted in FIG. 7.

Particular Implementations

In one implementation, a method is described that includes receiving by at least one computer a natural language trigger pattern and price point specified on behalf of a sponsor to trigger a sponsored message in response to a natural language query. It further includes accessing a database of past queries and identifying by the computer a set of past queries that would trigger the natural language trigger pattern and accessing in the database at least frequencies of the set of past queries and price point distributions of past messages triggered by the set of past queries. Includes determining by a computer and reporting to a further process at least estimates of a frequency of past queries triggered by the natural language trigger pattern and of a ranking of the sponsored message among sponsored search results that would have been delivered in response to the past queries triggered competing against past messages using the sponsor's price point.

This method and other implementations of the technology disclosed can each optionally include one or more the following features.

The sponsored message can be a sponsored search result on a search results page or it can be displayed on a landing page reached from a search results page.

The method can further include reporting samples of past queries triggered by the natural language trigger pattern. It also can include reporting samples of past queries triggered by the natural language trigger pattern that are won and lost at the sponsor's price point.

The natural language trigger pattern can include geographic criteria, and the database can include at least categorical data regarding respective geographic focuses of past queries. The database can include non-categorical data identifying respective geographic focuses of past queries.

The processing the geographic criteria and the natural language trigger pattern can proceed in sequential steps and in an order of processing chosen to reduce computing resource requirements.

The natural language trigger pattern can include temporal criteria, and the database can include at least categorical data regarding respective temporal focuses of past queries. The database can include non-categorical data identifying respective temporal focuses of past queries.

The method can further include receiving a range of price points and reporting the number of impressions that would have been delivered in response to the past queries triggered at a plurality of price points along the range.

The method can further include receiving a plurality and/or range of geographic criteria and reporting the number of impressions that would have been delivered in response to the past queries triggered with the plurality or range of geographic criteria.

Other implementations may include non-transitory computer readable storage medium storing instructions executable by a processor to perform a method is described above. Yet another implementation may include a system with memory and one or more processors operable to execute instructions stored in memory to perform a method as described above.

In another implementation, a method is described that includes receiving by a computer a first plurality of natural language trigger patterns and price points of active sponsored messages specified on behalf of a first set of sponsors to trigger in response to a natural language query and accessing at least one database of past queries and determining with a computer which of the past queries would trigger first plurality of natural language trigger patterns and generating associations between the past queries and respective triggered instances in the first plurality of natural language trigger patterns. The method further includes receiving by at least one computer a further natural language trigger pattern and price point specified on behalf of a further sponsor to trigger a message in response to the natural language query and accessing the database of past queries and identifying by the computer a set of past queries that would trigger the further natural language trigger pattern.

The method further includes accessing in the database at least frequencies of the set of past queries and price point distributions of active sponsored messages campaigns that would be triggered by the set the past queries. It includes determining by a computer and reporting to a further process at least a frequency of the set of past queries triggered by the natural language trigger pattern and a ranking of the message among sponsored search results that would have been delivered in response to the set of past queries competing against the active sponsored messages using the further sponsor's price point.

This method and other implementations the technology disclosed can each optionally include one or more the following features and any of the preceding features.

The method can further include maintaining the associations between the past queries and respective triggered instances in the first plurality of natural language trigger patterns by pruning the associations of expired ad campaigns from the database.

The sponsored message can be a sponsored search result on a search results page or it can be displayed on a landing page reached from a search results page.

As previously indicated, other implementations may include non-transitory computer readable storage medium storing instructions executable by a processor to perform a method is described above. Yet another implementation may include a system with memory and one or more processors operable to execute instructions stored in memory to perform a method as described above.

While the present invention is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

The invention claimed is:

1. A method of predicting future ad price distributions, the method comprising:
   configuring a memory with a database of past natural language queries, the past natural language queries being represented as deep structures;
   configuring the memory with a database of active sponsored messages, the active sponsored messages comprising natural language trigger patterns and corresponding prices;
   configuring the memory with a database of projected results of the past queries processed against the natural language trigger patterns and the corresponding prices of the active sponsored messages;
   indexing data stored in the database of past natural language queries, the indexing being based on the deep structures;
   predicting future ad price distributions from the projected results of the past queries processed against the natural language trigger patterns and the corresponding prices of the active sponsored messages; and
   reporting the future ad price distributions to an advertiser.

2. A method of indexing data, the method comprising:
   configuring a memory with a database of past natural language queries, the past natural language queries being represented as deep structures;
   configuring the memory with a database of active sponsored messages, the active sponsored messages comprising natural language trigger patterns and corresponding prices;

configuring the memory with a database of projected ad results of the past natural language queries processed against the natural language trigger patterns and the corresponding prices of the active sponsored messages;
indexing the past natural language queries as a joint distribution of multiple variables; and
reporting statistics about the projected ad results to an advertiser, the statistics including an estimated frequency of past queries that trigger the natural language trigger patterns of the active sponsored messages.

3. The method of claim 1, wherein at least one active sponsored message of the active sponsored messages is added to the database of active sponsored messages after the past queries have been received and stored in the database of past queries.

4. The method of claim 1,
wherein the active sponsored messages include trigger pattern criteria provided by sponsors of results,
wherein the projected results are determined by identifying trigger pattern criteria of an active sponsored message, of the active sponsored messages, that matches a past query of the past queries, and
wherein the method further comprises providing a sponsored result associated with the identified trigger pattern criteria that matches the past query.

5. The method of claim 1, wherein the past queries are natural language queries obtained from spoken words.

6. The method of claim 5, wherein the past queries are represented as deep structures, the deep structures using semantic representation that populates predefined categories using words included in the natural language queries.

7. The method of claim 1, wherein the active sponsored messages are paid-for active sponsored messages.

8. The method of claim 7, wherein the active sponsored message comprise sponsored ads.

9. The method of claim 1, wherein the corresponding prices are prices for advertising the active sponsored messages.

10. The method of claim 1, wherein the corresponding prices are prices related to an advertised products associated with the active sponsored messages.

11. The method of claim 1, wherein the corresponding prices include (i) prices for advertising the active sponsored messages and (ii) prices related to advertised products associated with the active sponsored messages.

12. The method of claim 1, further comprising displaying an active sponsored message, of the active sponsored messages, on a search results page or a landing page reached from the search results page.

13. The method of claim 1, further comprising reporting samples of past queries processed against the natural language trigger patterns.

14. The method of claim 1, wherein the natural language trigger patterns include geographic criteria and the database of past queries includes categorical data regarding respective geographic focuses of the past queries.

15. The method of claim 1, wherein the natural language trigger patterns include geographic criteria and the database of past queries includes data identifying respective geographic focuses of the past queries.

16. The method of claim 1, wherein the natural language trigger patterns include temporal criteria and the database of past queries includes categorical data regarding respective temporal focuses of the past queries.

17. The method of claim 1, wherein the natural language trigger patterns include temporal criteria and the database of past queries includes data identifying respective temporal focuses of the past queries.

18. The method of claim 1, further comprising receiving a plurality of geographic criteria and reporting a number of previous active messages that would have been delivered in response to the past queries matched with the plurality of geographic criteria.

19. The method of claim 1, wherein the natural language trigger patterns include quality criteria and the database of past queries includes data identifying respective quality focuses of the past queries.

20. A system including one or more processors coupled to memory, the memory being loaded with computer instructions to predict future ad price distributions, the computer instructions, when executed on the one or more processors, causing the one or more processors to implement actions comprising:
configuring a memory with a database of past natural language queries, the past natural language queries being represented as deep structures;
configuring the memory with a database of active sponsored messages, the active sponsored messages comprising natural language trigger patterns and corresponding prices;
configuring the memory with a database of projected results of the past queries processed against the natural language trigger patterns and the corresponding prices of the active sponsored messages;
indexing data stored in the database of past natural language queries, the indexing being based on the deep structures;
predicting future ad price distributions from the projected results of the past natural language queries processed against the natural language trigger patterns and the corresponding prices of the active sponsored messages; and
reporting the future ad price distributions to an advertiser.

* * * * *